July 29, 1969  R. H. MUNCH ET AL  3,458,117
METHOD OF PRODUCING VACUUM
Filed Oct. 31, 1966
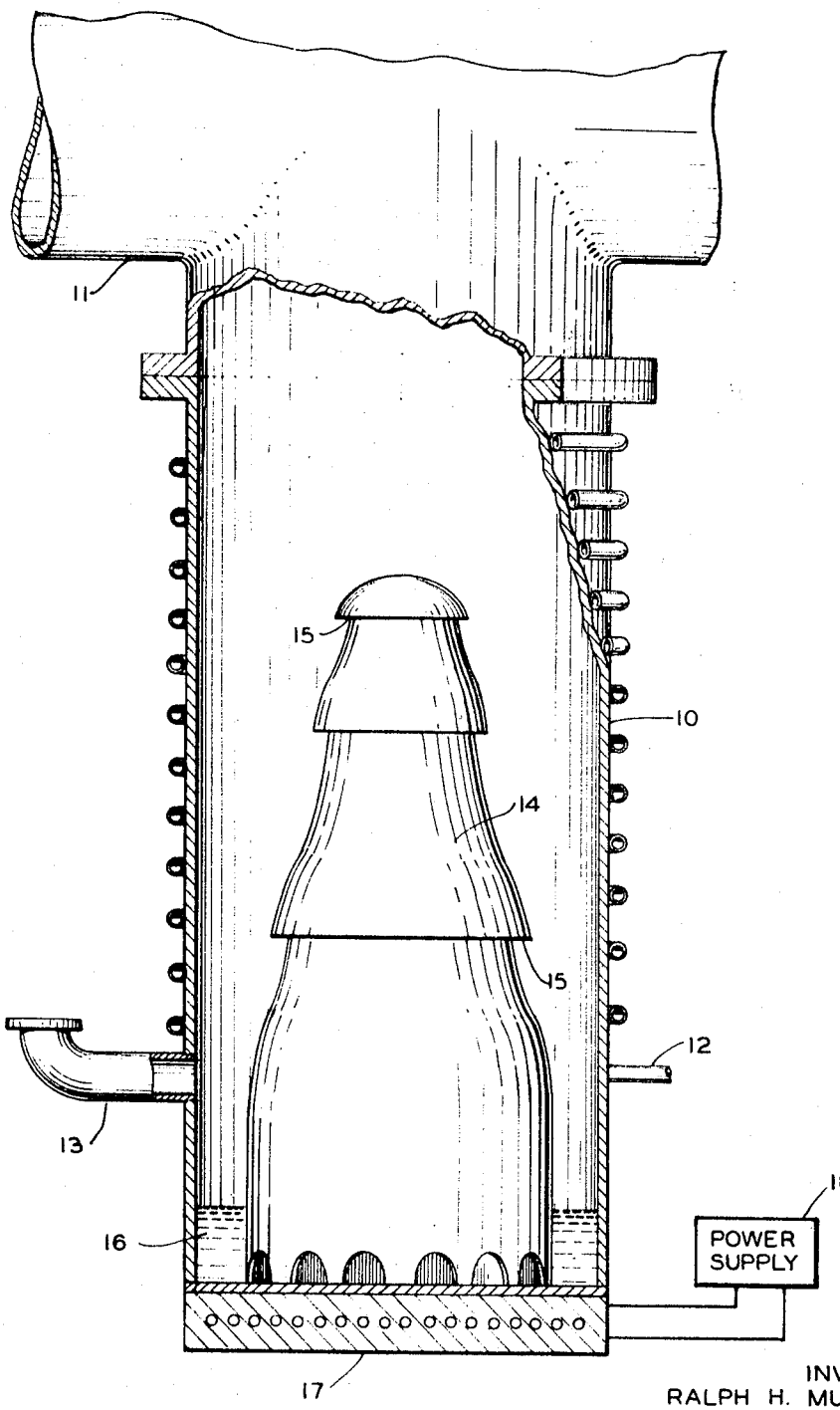
INVENTORS
RALPH H. MUNCH
QUENTIN E. THOMPSON
BY
William H. Duffey
ATTORNEY

United States Patent Office 3,458,117
Patented July 29, 1969

---

3,458,117
METHOD OF PRODUCING VACUUM
Ralph H. Munch, Webster Groves, Mo., and Quentin E. Thompson, Belleville, Ill., assignors to Monsanto Company, St. Louis, Mo., a corporation of Delaware
Filed Oct. 31, 1966, Ser. No. 591,375
Int. Cl. F04f 9/00
U.S. Cl. 230—101    6 Claims

ABSTRACT OF THE DISCLOSURE

Method for producing vacuum which employs working fluids comprising certain alkylthiophenes.

---

This invention relates to improved methods for producing vacuum and more particularly relates to vacuum producing means employing working fluids comprising certain alkylthiophenes.

In the past, different working fluids have been employed in vacuum producing means to produce low vacuum (above about $10^{-3}$ mm. Hg pressure) than have been employed to produce high vacuum (below about $10^{-3}$ mm. Hg pressure). One of the principal requirements of a working fluid for vacuum producing means is that it have a low vapor pressure since, unless traps are employed, the vacuum which can be produced is limited by the vapor pressure of the working fluid. Differences in the operating principle of the vacuum producing means and the cost of the fluid have controlled the choice of working fluids. Thus, working fluids employed in mechanical means must function as a lubricant for the moving parts while fluids used in vapor actuated means must be thermally, hydrolyticly and oxidatively stable as well as free of volatile contaminants. The cost of the working fluid required to produce high vacuum prohibits their use to produce lower vacuum since less expensive fluids may be employed to achieve the maximum vacuum producing capability of the means employed.

A fluid has now been discovered which, because of its low cost, excellent physical properties and functional capabilities, can be employed in either mechanical or vapor actuated pumps, hereinafter referred to as vacuum producing means, to produce either low or high vacuum. A typical vapor actuated vacuum pump is illustrated by a partially-sectioned elevation view in the sole figure of the drawing.

An object of this invention is to provide a method for producing vacuum with a vacuum producing means wherein a working fluid is employed. Another object of this invention is to provide a working fluid for use in either low or high vacuum producing means. Another object of this invention is to provide a method of producing very high vacuum. Other objects of this invention will become apparent from the following description of the invention.

According to this invention, there is provided an improved method which comprises producing a vacuum with a vacuum producing means employing a working fluid wherein the fluid is selected from the group consisting of (1) a compound of the formula I
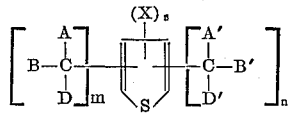

wherein A, B, D, A′, B′ and D′ are each selected from the group consisting of branched or straight chain alkyl $C_{1-18}$ groups, phenyl and halophenyl groups provided at least 2 of A, B, and D, and at least 2 of A′, B′ and D′ are alkyl $C_{1-18}$ groups; further provided that when alkyl any two of A, B, D, and of A′, B′ and D′ together with the carbon atom to which they are attached can be members of an alicyclic hydrocarbon ring having from 4 to 8 carbon atoms in the ring, X is a halogen, m and n are integers from 0 to 1, providing the sum of $m+n$ is at least 1 and z is an integer from 0 to 2 and (2) mixture of two or more compounds represented by I.

Typical compounds of the above Formula I are as follows:

2,5-(1-hexyl-1-methylnonyl)thiophene,
3,4-(1-hexyl-1-methylnonyl)thiophene,
2,4-(1-hexyl-1-methylnonyl)thiophene,
2,5-tert-butyl-3,4-dichloro thiophene,
2-tert-butyl thiophene,
3-chloro-5-tert-butyl thiophene,
3-tert-butyl thiophene,
3-bromo-4-(1-hexyl-1-methylnonyl)thiophene,
2,5-tert-butyl thiophene,
2-tert-butyl-5-(1-hexyl-1-butyldodecyl)thiophene,
2,5-(1,1-dimethylpropyl)thiophene,
2-fluoro-5-(1-butyl-1-hexyldodecyl)thiophene,
2,5-(1-butyl-1-octylnonyl)thiophene,
2-(1-hexyl-1-methylnonyl)-5-(1-butyl-1-propyldecyl)-thiophene,
2-tert-butyl-4-(1-octyl-1-methyloctadecyl)thiophene,
2,5-(1-octyl-1-methyldecyl)thiophene,
3,4-(1,1-dimethyloctadecyl)thiophene,
2,5-(1,1-dimethyltridecyl)thiophene,
2,4-(1,1-dioctyloctadecyl)thiophene,
2,4-(1,1-dimethyltridecyl)thiophene,
3,4-(1-octyl-1-nonyloctadecyl)thiophene,
3,4-(1,1-dimethyltridecyl)thiophene,
3-(1,1-dimethyloctadecyl)thiophene,
2-(1,1-dibutylnonyl)thiophene,
3-(1-butyl-1-methyloctyl)thiophene,
2-(1,1-dipentylnonyl)thiophene,
2-(1,1-dihexyloctadecyl)thiophene,
2-(1-methylcyclohexyl)thiophene,
2-(1-butylcyclopentyl)thiophene,
2,5-(1-methylcyclooctyl)thiophene,
2,5-(1-propylcyclobutyl)thiophene,
2-(1-propylcyclobutyl)thiophene,
2,5-(1-phenyl-1-methylnonyl)thiophene,
2-(1-chlorophenyl-1-ethyloctyl)thiophene,
3-(1-phenyl-1,4-dimethylhexyl)thiophene and
2,5-(1-fluorophenyl-1-methyl-6-propylnonyl)thiophene.

The working fluids useful in the process of this invention can be prepared by direct alkylation of thiophene or halogenated thiophene with suitable olefins in the presence of a suitable catalyst. Exemplary olefins are those represented by the structure II
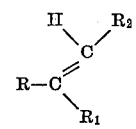

where R and $R_1$ are each selected from the group consisting of straight chain alkyl groups aryl, alkaryl, aralkyl, haloaryl groups and $R_2$ is selected from hydrogen and $C_{1-18}$ branched or straight chain alkyl groups.

The reaction of thiophene and olefins is aided by known catalysts such as active clays, boron fluoride complexes, tin halides, sulfuric acid, aluminum chloride and hydrogen fluoride. Under catalytic influence the reaction probably takes place as follows:

III
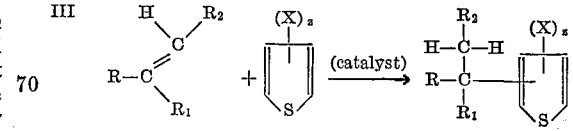

where R, $R_1$, X, z, and $R_2$ have the same meaning as above.

Dialkylthiophenes are prepared according to the same reaction by allowing 2 moles of olefin to react with 1 mole of thiophene.

The following examples more particularly describe the preparation of the compounds of Formula I of this invention wherein parts are parts by weight.

Example 1

Into a reactor equipped with a reflux condenser, a liquid addition means and a heating means there were placed 21 parts of thiophene, 100 parts of 2-hexyl-1-decene and 5.6 parts of boron trifluoride etherate as a catalyst. The reaction mixture was heated slowly to a temperature in the range of from 90° to 100° C. After about 1 hour in that temperature range, an additional charge of 23 parts of 2-hexyl-1-decene was added and the mixture was stirred for an additional 3 hours within the same temperature range. The catalyst was then deactivated by the addition of about 11 parts of calcium oxide followed by about 2 hours of continued agitation at 100° C. Solids were separated by filtration and the filtrate was subjected to distillation at reduced pressure. The distillate, boiling in the range 245–255° C. (1 mm. Hg) was redistilled to yield a mixture of 2,4- and 2,5-(1-hexyl-1-methylnonyl)thiophenes which was indicated by g.l.c. to be of >99.5% dialkylthiophene content.

The thermal stability of the product of Example 1 was determined by the use of an isoteniscope according to the procedure of Blake et al., J. Chem. Eng. Data, 6, 87 (1961). The basis for this procedure is that when a fluid is heated in the isoteniscope apparatus, it exerts a vapor pressure which can be readily measured. The vapor pressure increases as temperature is increased following a straight-line relationship when logarithm of pressure is plotted versus the reciprocal of the absolute temperature. The vapor pressure curve will depart from a straight line if decomposition occurs to give volatile products. The temperature at which this occurs is called the decomposition temperature ($T_D$) and the product of Example 1 was found to have a thermal decomposition temperature of 625° F.

Example 2

Into a suitable reaction vessel there were placed 95.4 grams (.2 mole) of 2-tridecyl-1-tridecene and 55 parts of boron trifluoride ethyletherate. Then 168 parts (2 moles) of thiophene were added under a nitrogen blanket at 50° C. The reaction mixture was heated to 80° C. and maintained at that temperature for 9 hours with continuous agitation. Water was added (200 parts) to stop the reaction and the mixture was agitated for an additional 9 hours. The water was then removed, the reaction mixture was washed with 1% sodium hydroxide followed by 2 water washes and then filtered. The filtrate was vacuum distilled to yield 174 parts of 2-(1-tridecyl-1-methyldodecyl)thiophene recovered at a vapor temperature of 218°–223.5° C. and at a pressure of 18 mm. of Hg.

Although the mono- and dialkylthiophenes of this invention are referred to as specific isomers such as the 2- or 2,5-isomers they can contain the corresponding 3- and 2,4 alkyl or dialkyl isomers without affecting their usefulness in the method of this invention. The working fluids of this invention are easily purified for use in producing very high vacuum in vapor actuated pumps by distillation as described in Example 1 above. The purification procedure can also include treatment with alumina or activated charcoal after distillation.

In Table I below there are listed some physical properties of various mono- and dialkylthiophenes useful in the method of this invention.

TABLE I.—PHYSICAL PROPERTIES OF VARIOUS MONO- AND DIALKYLTHIOPHENES

| Compound | B.P. (° C.) at mm. | Viscosity (cs.) at ° F. | | | | Pour point (° F.) |
|---|---|---|---|---|---|---|
| | | 210° | 100° | −30° | −40° | |
| (1) 2,5-(1-hexyl-1-methylnonyl)thiophene | 250°/0.5 | 7.51 | 55.5 | 13,522 | 29,552 | <−5 |
| (2) 2,5-(1-octyl-1-methylunadecyl)thiophene | 295°–307°/1.0 | 9.76 | 71.1 | 21,000 | 55,000 | +15 |
| (3) 2,5-(1-1-dimethyltetradecyl)thiophene | 255°–257°/0.35 | | | | | +95 |
| (4) 2,5-(1,1-dimethylhexadecyl)thiophene | 280°/0.4 | | | | | >100 |
| (5) 2,5-(1-dodecylcyclopentyl)thiophene | 255°–284°/0.25 | 7.8 | 52.36 | | 1 50,000 | 98 |
| (6) 2-(1,1-didecyltetradecyl)thiophene | 267°–269°/.4 | 7.74 | 52.99 | | 30,252 | <−40 |
| (7) 2-(1-unadecyl-1-methyltetradecyl)thiophene | 250°/1.0 | 5.36 | 28.94 | | 1 10,000 | −28 |
| (8) 2-(1-unadecyl-1-methyltridecyl)thiophene | 237°/0.65 | 4.90 | 26.23 | | 8,043 | |
| (9) 2,5-(1-ethyl-1-methylpentyl)thiophene | 163°/0.9 | 2.54 | 13.99 | 12,843 | 35,868 | −50 |
| (10) 2-(1-hexyl-1-methylnonyl)thiophene | | 2.39 | 10.61 | 1,096 | 2,202 | |

1 Extrapolated viscosities.

From the above, it is evident that mono- and dialkylthiophenes are especially well suited as working fluids in vacuum producing means. That is, the boiling points are high, indicating desirably low vapor pressures and the viscosity data indicates the wide liquid range desirable for use in mechanical means for producing vacuum. In addition, the thermal decomposition temperature ($T_D$) of the compounds determined as described above are in the range of from about 600° F. to about 625° F. which render them especially desirable for use in vapor actuated vacuum pumps.

The superior thermal and oxidative stability of the thiophenes of Formula I as compared to alkylthiophenes having hydrogen atoms on the alkyl carbon atom bonded to the thiophene nucleus is illustrated by the data in Table II below. In Table II there are presented the results of tests of oxidative stability of fluids wherein samples of the fluid are contacted with oxygen gas for a period of 40 minutes in the presence of metal while the samples are being agitated and maintained at a temperature of 450° F. The amounts of oxygen which pass into and out of the sample are measured and the differences noted ascribed as the amounts taken up by the fluid. The amount of oxygen taken up by the fluid has been found to be directly proportional to the amount of oxidation occurring in the fluid. Thus, the oxidative stability of various alkylthiophenes was determined and the data presented below as moles of oxygen uptake per mole of fluid contacted by the oxygen gas. A low number is desirable. To determine oxidative stability of the fluids in the presence of metal, wire specimens of aluminum alloy, magnesium alloy, copper, iron, titanium and silver were placed in the test sample.

TABLE II

| Fluid: | Mole of $O_2$ uptake per mole of fluid |
|---|---|
| 2,5-(1-hexyl-1-methylnonyl)thiophene | 0.34 |
| 2-(1-undecyl)-1-methyltetradecyl)thiophen [1] | 1.14 |
| 2-n-tetradecylthiophene | 1.11 |
| 2,5-di-n-tetradecylthiophene | 3.00 |
| 2-n-tetradecyl-5-(1-hexyl-1-methylnonyl)thiophene | 2.02 |
| Pentaerythritol ester [2] | 4.60 |

[1] Oxygen contact for 360 minutes.
[2] Pentaerythritol esterified with a mixture of $C_{4-9}$ aliphatic acids which also contained amine oxidation inhibitors.

The above data illustrates the superior oxidative stability of the compounds of Formula I over the n-alkyl thiophenes by the comparatively lesser amount of oxygen uptake. Also included in Table II are the results of the test when employing a pentaerythritol ester containing well-known oxidation inhibitors dioctyldiphenylamine and phenyl alpha napthylamine. The ester was included for the purpose of indicating the superior thermal and oxidative stabilities of the alkylthiophenes of this invention over those of a stabilized functional fluid.

Further evidence of the desirability of the alkyl-thiophenes of Formula I as lubricants for use as the working fluid in vacuum producing means requiring lubrication is furnished by the data presented in Table III. These data were obtained from comparative runs in a Shell four ball test machine operated for 1 hour at 600 r.p.m. under a load of 40 kg. using steel on steel balls. Other fluids were included in the test for the purpose of comparison. The alkylthiophenes of this invention contained no additive of any kind while the other fluids were formulated with lubricity agents.

TABLE III

| Lubricant: | Scar diameter, mm. |
| --- | --- |
| 2,5-(1-hexyl-1-methylnonyl)thiophene | .87 |
| Aliphatic ester lubricant | 1.07 |
| Mineral oil | .74 |

The above data indicates the lubricity of the alkylthiophenes of Formula I. That is, without additives, the alkylthiophenes of this invention possess lubricity which compares favorably with that of commercially accepted standards achieved by other fluids through the aid of lubricity agents.

In accordance with the above data, it is evident that the mono- and dialkylthiophenes of this invention are especially useful as working fluids for vacuum producing means.

Preferred compounds are compounds of Formula I wherein A, B, D, A', B' and D' are alkyl $C_{1-18}$ groups and the total number of carbon atoms is within the range of from 20 to 40. More preferably that number of carbon atoms is contained in two groups, i.e., where $m+n$ is 2. Typical examples of such preferred compounds are 2,5-(1-hexyl-1-methylnonyl)thiophene; 2,4-(1-hexyl-1-methylnonyl)thiophene; 2,5-(1-octyl-1-methylundecyl)thiophene; 2,5-(1-ethyl-1-methyloctyl)thiophene.

Vacuum producing means employed in the method of this invention are those wherein a working fluid is employed. Working fluids are employed in vacuum producing means such as reciprocating piston, rotary piston, liquid jet, rotary blower (turbine wheel and two- or three-lobe gear pumps) and vapor actuated pumps. In mechanical pumps, the working fluid is employed to lubricate the moving parts, seal valves and as a coolant as well as to increase the capability of the pump by filling the well-known "harmful space" between the piston and exhaust valve. In vapor actuated pumps, the working fluid is vaporized and the vapor is passed through a jet or nozzle or a series thereof as in a multi-stage fractionating pump.

A typical embodiment of a vapor actuated vacuum pump is illustrated in the sole figure of the drawing. Referring now to the drawing, upright tubular shell 10 forms the outer shell of the vacum pump. Shell 10 is connected to vacuum chamber 11 which is to be evacuated. Water tubing 12 coiled around the outside of tubular shell 10 cools the vacuum pump to condense the pumping fluid vapor which impacts against the inside surface of the shell. A small connecting tube 13 sealed into the side of shell 10 provides for connection to a forevacuum pump. A vapor jet forming tubulation 14, smaller than shell 10, is located inside shell 10 in coaxial relationship therewith. Tubulation 14 has annular nozzles 15 formed therein in the usual manner for diffusion pumps, three such nozzles being employed in the illustrated embodiment. Nozzles 15 are vertically spaced and coaxial with tubulation 14 to provide the customary annular vapor jets directed outwardly and downwardly towards the inside wall of shell 10. A pumping fluid 16 is provided in the bottom of shell 10 and tubulation 14. An electric heater 17, coupled to a power supply 18, is disposed in contiguity with the base of shell 10 and heats the pumping fluid 16. Vapor from the heated pumping fluid rises into tubulation 14 and is ejected through nozzles 15.

Example 3

To demonstrate the method of this invention, the product of Example 1 was employed as the working fluid in an all glass three stage, fractionating type, air cooled diffusion pump which was connected through 1 inch tubing to a Dewar type cold trap and then to a Bayard-Alpert ionization gage. Fore pressure was measured using a pirani type vacuum gage. A U-tube trap was provided between the fore pump and the diffusion pump to trap volatile decomposition products formed by the thermal decomposition of the fluid. The amount of decomposed fluid was determined after the run by weighing the U-tube, then cleaning and reweighing making a suitable correction for buoyancy.

To perform the test, 150 cc. of fluid were placed in the diffusion pump and the system was evacuated by the fore pump. Electrical heaters were then turned on in the three stages of the diffusion pump and the residue boiler and the condenser was cooled by a small air blast. The pump was insulated with mineral wool batting to preserve heat. After degassing and fractionating the fluid so as to evenly distribute the fluid in each boiler, the ionization gage was turned on and after an initial reading, the gage was turned off and baked at 450° C. The gage was allowed to cool and again turned on and the system operated until equilibrium pressure of $5 \times 10^{-9}$ mm. of Hg was reached. The U-tube was cooled with liquid nitrogen for a known length of time while maintaining the pressure above noted. The fluid decomposition rate was determined by weight difference to be .43 mg./hour.

From the above, it is evident that the compounds of Formula I are easily prepared and purified to provide working fluids useful in vacuum producing means wherein a working fluid is employed. The extremely high vacuum produced by employing the working fluids described by the compounds of Formula I are equally well suited, due to their low cost and functional characteristics for use in means to produce low vacuum.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In the method of producing vacuum which comprises; boiling a working fluid to produce a vaporous form thereof and utilizing the vapor to entrain fluid which is to be evacuated, the working fluid comprising a composition selected from the group consisting of (1) a compound of the formula

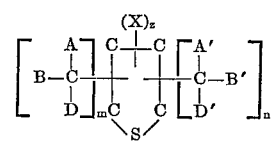

wherein A, B, D, A', B' and D' are each selected from the group consisting of branched and straight chain alkyl $C_{1-18}$ groups, phenyl and halophenyl groups provided at least 2 of A, B, and D, and at least 2 of A', B' and D' are alkyl $C_{1-18}$ groups and further provided that when alkyl any two of A, B, D and A', B' and D' groups together with the carbon atom to which they are attached can be members of an alicyclic hydrocarbon ring having from 4 to 8 carbon atoms, X is a halogen, $m$ and $n$ are integers from 0 to 1, providing the sum of $m+n$ is at least 1 and $z$ is an integer from 0 to 2 and (2) mixtures of (1).

2. A method of claim 1 wherein the vacuum producing means utilized in carrying out the method is a multistage, fractionation type vacuum pump.

3. A method of claim 1 where $z$ is 0.

4. A method of claim 1 where A and A' are methyl and $z$ is 0.

5. A method of claim 1 where the working fluid is 2,5-(1-hexyl-1-methylnonyl)thiophene.

6. A method of claim 1 where A, B, D, A', B' and D' are alkyl $C_{1-18}$ groups and have a total of from 20 to 40 carbon atoms.

References Cited

UNITED STATES PATENTS

| | | | |
|---|---|---|---|
| 3,395,101 | 7/1968 | Clark et al. | 252—48.8 |
| 2,528,782 | 11/1950 | Reiff et al. | 252—45 |
| 2,932,615 | 4/1960 | Jordan et al. | 252—37.2 |
| 3,353,742 | 11/1967 | Bowman et al. | 230—101 |

DONLEY J. STOCKING, Primary Examiner

WARREN J. KRAUSS, Assistant Examiner

U.S. Cl. X.R.

252—45, 78